United States Patent
Lee (10) Patent No.: US 10,154,540 B2
(45) Date of Patent: *Dec. 11, 2018

(54) LTE-1X HYBRID DEVICE AND SYSTEM

(71) Applicant: Intel Corporation, Santa Clara, CA (US)

(72) Inventor: Anthony Lee, San Diego, CA (US)

(73) Assignee: Intel Corporation, Santa Clara, CA (US)

(*) Notice: Subject to any disclaimer, the term of this patent is extended or adjusted under 35 U.S.C. 154(b) by 165 days.

This patent is subject to a terminal disclaimer.

(21) Appl. No.: 13/853,119

(22) Filed: Mar. 29, 2013

(65) Prior Publication Data

US 2014/0295912 A1 Oct. 2, 2014

(51) Int. Cl.
*H04W 88/06* (2009.01)
*H04W 60/00* (2009.01)

(52) U.S. Cl.
CPC ......... *H04W 88/06* (2013.01); *H04W 60/005* (2013.01)

(58) Field of Classification Search
CPC . H04W 28/0205; H04W 88/06; H04W 36/14; H04W 36/026; H04W 4/16; H04W 72/1215; H04W 56/00; H04W 72/1242; H04B 7/2628; H04B 2201/70701; H04B 2201/70702; H04L 12/56; H04L 29/0653; H04L 49/3009
USPC ..... 455/435.1, 436, 437, 438, 445; 370/335, 370/354, 389, 392, 401; 379/201.02, 379/201.06, 201.8
See application file for complete search history.

(56) References Cited

U.S. PATENT DOCUMENTS

| | | | |
|---|---|---|---|
| 6,195,571 B1* | 2/2001 | Osuge | G08B 6/00 340/7.58 |
| 6,473,422 B2* | 10/2002 | Hall | H04W 4/16 370/352 |
| 6,671,287 B1* | 12/2003 | Huttunen | H04W 28/06 370/465 |
| 7,251,490 B2* | 7/2007 | Rimoni | H04W 36/0061 370/331 |
| 7,688,760 B2* | 3/2010 | Xu | H04L 12/5692 370/255 |
| 8,565,223 B2 | 10/2013 | Lee | |
| 8,666,400 B2* | 3/2014 | Islam et al. | 455/434 |
| 9,025,576 B2* | 5/2015 | Sikri et al. | 370/336 |
| 9,055,496 B2* | 6/2015 | Das et al. | |
| 9,370,043 B2* | 6/2016 | Swaminathan | H04W 72/1215 |
| 2002/0068564 A1* | 6/2002 | Gustavsson et al. | 455/435 |

(Continued)

FOREIGN PATENT DOCUMENTS

CN 102083147 6/2011

*Primary Examiner* — Julio Perez
(74) *Attorney, Agent, or Firm* — Schiff Hardin LLP (57) ABSTRACT

An apparatus for notification of a circuit switched event in a mobile station. The apparatus comprising a circuit switched modem, a packetized data modem and a radio. The circuit switched modem, configured to communicate circuit switched data over a circuit switched network. The packetized data modem, configured to communicate packetized data over a packetized data network. The radio, configured to couple the packetized data modem to the packetized data network via a packetized data radio link, and configured to couple the circuit switched modem to the circuit switched network via a circuit switched radio link, wherein said radio comprise one transmitter and two receivers.

19 Claims, 5 Drawing Sheets

(56) References Cited

U.S. PATENT DOCUMENTS

| | | | |
|---|---|---|---|
| 2004/0058688 A1* | 3/2004 | Silver | H04W 8/08 |
| | | | 455/456.1 |
| 2006/0111115 A1* | 5/2006 | Marin et al. | 455/442 |
| 2007/0218911 A1* | 9/2007 | Islam et al. | 455/445 |
| 2008/0310357 A1* | 12/2008 | Ulupinar | H04L 1/0028 |
| | | | 370/329 |
| 2012/0258707 A1* | 10/2012 | Mathias | H04W 36/30 |
| | | | 455/426.1 |
| 2012/0270545 A1* | 10/2012 | Zhao et al. | 455/435.1 |
| 2013/0122827 A1* | 5/2013 | Ali | H04B 1/3838 |
| | | | 455/77 |
| 2013/0142088 A1* | 6/2013 | Li | H04W 88/06 |
| | | | 370/271 |
| 2013/0235843 A1* | 9/2013 | Gohari | H04W 80/06 |
| | | | 370/331 |

* cited by examiner

LTE-1X HYBRID DEVICE AND SYSTEM

BACKGROUND OF THE INVENTION

Field of the Invention

This invention relates in general to the field of cellular communications, and more particularly to a mechanism for performing circuit switched fallback in a single radio dual mode cellular system.

Description of the Related Art

The cell phone industry is undergoing exponential growth, not only in this country, but all over the world. In fact, it is well known that the over twenty percent of the adult population in the United States do not even have a traditional landline telephone. In addition to those who do not own a conventional telephone, nearly ninety percent of the adult population owns a wireless phone.

And the usage of cell phones is increasing as well over the use of traditional landline telephone coverage. In fact, one in seven adults now uses only cell phones. Whereas in the past cell phones were used when a landline was not available or under emergency conditions, lower carrier rates, affordability of family packages, and free mobile-to-mobile or friend-to-friend promotions have fostered in significant increases in usage. It is not uncommon today to walk into any public forum or facility and notice a majority of the people there talking on their cell phones.

The ability to communicate using a mobile phone, or mobile station, has been available since the middle of the last century. However, during the 1990's so-called "2G" or second generation mobile phone systems were provided that began the growth in both deployment and usage that we currently enjoy today. These initial systems predominately provided for the routing and reliable servicing of voice calls between parties. And, as one skilled in the art will appreciate, there are a number of timing and latency requirements associated with transmission and reception of voice data in order to maintain quality of service. As such, so-called circuit switched voice links have been fielded that guarantee this quality of service.

And although wireless cellular network technologies have continued to provide improvements related to the ability to process voice calls, there has also been an enormous pull on the industry to provide for the reliable and efficient transfer of packetized data. As a result, the incremental developments in high speed packetized data networks have not always tracked with the development of voice networks. It is a goal within the industry to field a more unified solution that would provide both reliable voice and high speed data access, however, the industry is not at that point presently. Consequently, it is common practice to field a mobile system that provides for voice communications over one type of circuit switched network, say CDMA2000 1×RTT, and high speed data communications over another type of network, say LTE, which provides exclusively for packetized data and does not provide the quality of service that users prefer to support voice communications. In the near future, these hybrid solutions will be prevalent within the art.

In order to field such a hybrid system, designers are forced to develop protocols for those instances where two or more co-fielded networks create conflict, or where two or more co-fielded networks are required to interoperate.

This application deals with one such instance, that is, the switching between a high speed data network that provides exclusively for packetized data communications over to a circuit switched voice network in order to process and incoming or outgoing call or other circuit switched event, and more specifically, how such switching is presently affected utilizing a back end interworking solution that bridges circuit switched notifications through a packetized data "tunnel" in order to communicate these notifications to a mobile station.

In particular, protocols exist for fallback to a circuit switched network during a high speed data session in order to process an incoming or outgoing call. Most present day techniques follow a form of "tunneling," where notification data associated with the call is encapsulated into a sequence of data units that are exchanged over the packetized data network. And while effective, the present inventors have noted that special purpose hardware and programming is required as part of the overall architecture in order to provide this capability.

Accordingly, what is needed is a technique that would allow a mobile station to be notified of or to provide notification for a circuit switched event while communicating over a packetized data network, where tunneled messages and commensurate back end hardware/software is not required.

SUMMARY OF THE INVENTION

The present invention, among other applications, is directed to solving the above-noted problems and addresses other problems, disadvantages, and limitations of the prior art.

The present invention provides a superior technique for providing circuit switched fallback. In one embodiment, an mobile device for providing notification of a circuit switched event, the mobile device comprising a circuit switched modem, a packetized data modem and a radio. The circuit switched modem, configured to communicate circuit switched data over a circuit switched network. The packetized data modem, configured to communicate packetized data over a packetized data network. The radio, configured to couple the packetized data modem to the packetized data network via a packetized data radio link, and configured to couple the circuit switched modem to the circuit switched network via a circuit switched radio link, wherein said radio comprise one transmitter and two receivers.

One aspect of the present invention contemplates a packetized data network connected with a mobile device for providing notification of a circuit switched event, the packetized data network comprising a base station, a mobile management entity and a serving gateway. The base station, connected to the mobile device, configured to provide a packetized data radio link to the mobile station. The mobile management entity, connected to said base station. The serving gateway, connected to mobile management entity, and configured to provide packetized data, wherein the mobile device is connected to a circuit switched network with one transmitter and two receivers.

Further aspect of the present invention contemplates an An method for a mobile device which is configured for providing notification of a circuit switched event, the method comprising communicating circuit switched data over a circuit switched network, communicating packetized data over a packetized data network; and through a radio, coupling to the packetized data network via a packetized data radio link, and the circuit switched network via a circuit switched radio link, wherein said radio comprise one transmitter and two receivers.

Another aspect of the present invention comprehends a method for a packetized data network connected with a mobile device for providing notification of a circuit switched event, the method comprising connecting a base station to the mobile device, providing a packetized data radio link to the mobile station, connecting a mobile management entity to said base station; and connecting a serving gateway to said mobile management entity, and providing packetized data, wherein the mobile device is connected to a circuit switched network with one transmitter and two receivers.

BRIEF DESCRIPTION OF THE DRAWINGS

These and other objects, features, and advantages of the present invention will become better understood with regard to the following description, and accompanying drawings where.

DETAILED DESCRIPTION

Exemplary and illustrative embodiments of the invention are described below. In the interest of clarity, not all features of an actual implementation are described in this specification, for those skilled in the art will appreciate that in the development of any such actual embodiment, numerous implementation-specific decisions are made to achieve specific goals, such as compliance with system-related and business related constraints, which vary from one implementation to another. Furthermore, it will be appreciated that such a development effort might be complex and time-consuming, but would nevertheless be a routine undertaking for those of ordinary skill in the art having the benefit of this disclosure. Various modifications to the preferred embodiment will be apparent to those skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 1:
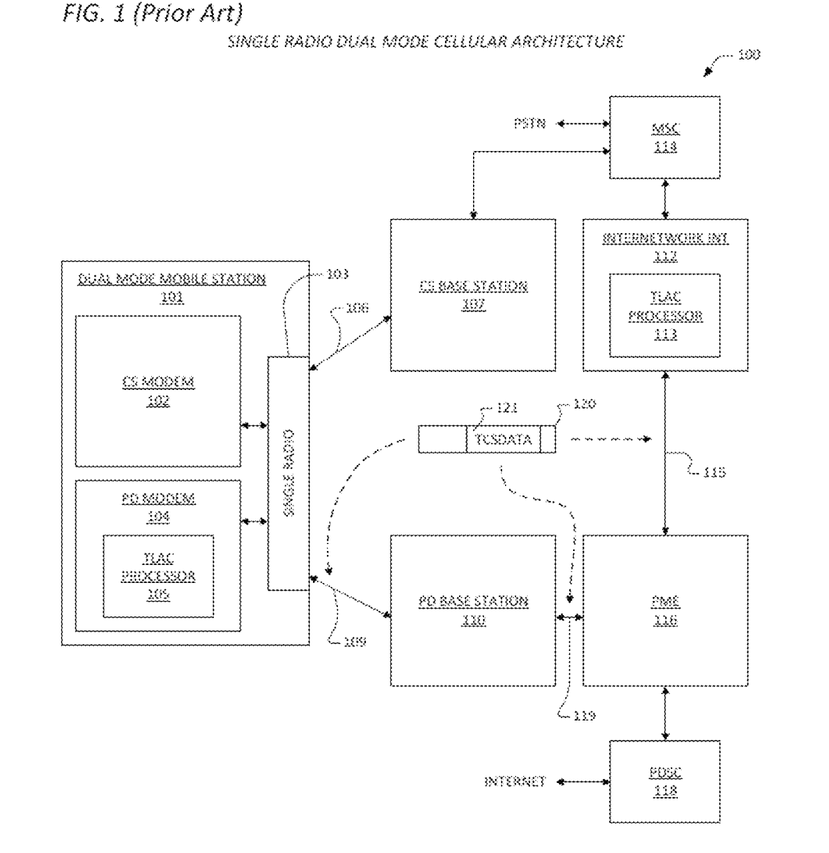
FIG. 1 is a block diagram illustrating a present day single radio dual mode cellular architecture.

In view of the above background discussion on CDMA2000 inter radio access interworking and associated techniques employed within a corresponding system to provide for signaling transactions for 1xRTT circuit switched notifications to/from a mobile station, a discussion of the limitations associated with present day mechanisms will be presented within reference to FIG. 1. Following this, a discussion of the present invention will be presented with reference to FIGS. 2-5. The present invention overcomes the limitations of present day tunneling mechanisms by providing a technique for signaling 1xRTT circuit notifications using a tune away process in a mobile station that does not require use of a tunnel and commensurate back end equipment.

Consider FIG. 1, where a block diagram is presented illustrating a present day single radio dual mode cellular architecture 100 for notifying a dual mode mobile station 101 of an incoming call or other circuit switched event over a packetized data radio link 109. The architecture 100 includes the mobile station 101, which has a circuit switched modem 102 for processing circuit switched cellular applications, and a packetized data modem 104, for processing packetized data applications. The modems 102, 104 are baseband modems 102, 104 and share a single radio 103 for transmission of signals over either the packetized data radio link 109 or a circuit switched radio link 106. The mobile station 101 is thus coupled to a circuit switched base station 107 via the circuit switched radio link 106 and to a packetized data base station 110 over the packetized data radio link 109.

The circuit switched base station 107 is coupled to a mobile switching center 114. The mobile switching center 114 is coupled to an internetworking interface 112. The internetworking interface 112 is coupled to a packetized management entity PME 116 via a packetized data link 115. The mobile switching center 114 routes calls and events to/from a public switched telephone network (PSTN). The PME 116 is coupled to a packetized data switching center 118, which routes data and events to/from a packetized data network such as the Internet.

In operation, circuit switched calls and events over the PSTN are routed by the mobile switching center 114 to the circuit switched base station 107. All control and traffic associated with the calls or other events occurs over the circuit switched radio link 106 are processed by the circuit switched modem 102 within the mobile station 101. Likewise, packetized data and events over the internet are routed by the packetized data switching center 118 to a particular packetized data mobility entity 116 that is interfaced to the packetized base station 110 currently assigned to the mobile station 101. All control and traffic associated with the packetized data or other events occur over the packetized data radio link 109 and are received by the radio 103 and processed by the packetized data modem 104 within the mobile station 101.

Of particular interest to the present application are scenarios and circumstances associated with certain present day dual mode configurations, one example of which is a single radio dual mode mobile station 101 that is capable of processing circuit switched calls and other events over a code demand multiple access (CDMA) radio link 106 such as might be found in a CDMA2000 1×RTT architecture, and that processes packetized data and other events over a packetized data radio link 109 such as might be found in a Evolved Universal Mobile Telecommunications System Terrestrial Radio Access Network (EUTRAN) architecture. The EUTRAN architecture is more commonly known as the Long Term Evolution (LTE) architecture and will henceforth be referred to as such in this application. As one skilled in the art will appreciate, the CDMA2000 1×RTT circuit switched architecture or called "1×" architecture is well known in the art for processing circuit switched calls (i.e., voice calls), and the LTE architecture is well known and is presently being fielded in major metropolitan centers around the world as an improvement in packetized data communications capabilities over the currently fielded EV-DO packetized data network. Additionally, well known to those in the art is that LTE is a network that consists exclusively of packetized data. That is, LTE does not support circuit switched channels such as those used to provide for conventional cellular voice calls. LTE does provide support for so-called voice-over-internet protocol (VoIP) calls, but as one skilled in the art will appreciate, the disadvantages associated with present day VoIP techniques (e.g., jitter) make general use of VoIP in a mobile station 101 highly unlikely.

Going forward in the present application, examples and terminology will be employed from both 1× and LTE applications because these are well appreciated and prevalently fielded technologies that can be effectively employed to teach present day limitations and how the present invention is utilized to overcome these limitations. However, the present inventors note that the scope of the present invention is not to be limited to 1× and LTE, but rather extended to comprehend single radio dual mode cellular architectures where one of the radio links 109 employed is presently utilized to notify the mobile station 101 of an incoming voice call or other event that is associated with a circuit switched link 106 having timing and quality of service properties and requirements unique to circuit switched applications.

In specific 1× and LTE terminologies, the mobile station 101 may be referred to as the user equipment (UE) 101. The packetized data mobility entity 116 is referred to as a mobility management entity (MME) 116, which is the primary access node for an LTE network. The MME 116 interfaces to many packetized data base stations 110, which are known as enhanced node Bs (eNBs) 110. The internetworking interface 112 is known as the S102 interface 112, or more commonly as the interworking solution (IWS) 112. The interworking solution 112 is responsible for interfacing a circuit switched network such as 1× to the LTE network via a tunneling mechanism. The packetized data radio link 109 is referred to as the LTE-Uu interface 109. Hence, when packetized data is being transmitted over the packetized data network to the mobile station 101, for purposes of the present application, the circuit switched elements 102, 107, 112 shown in the architecture 100 are effectively idle and the radio 103 is employed to communicate over the packetized data link 109. Packetized data is routed to/from the Internet via the packetized data switching center 118, through the packetized data mobility entity 116, through the packetized data base station 110, and over the packetized data radio link 109 to/from the packetized data modem 104 within the mobile station 101.

But when a circuit switched event (e.g., a call) comes into the mobile switching center 114 that is targeted for the mobile station 101, the mobile station 101 must be notified—over the packetized data radio link 109—that it must, in a timely fashion, cease processing packetized data, and fall back to a circuit switched radio link 106 in order to proceed further, that is, to accept the call. Yet, because circuit switched and packetized data protocols are not equivalent, designers are working to provide techniques and mechanisms that allow for this notification to take place. One such mechanism that is employed in the 1×/LTE environment is the aforementioned tunneling, whereby tunneled circuit switched data (TCSDATA) 121 provides for notification, acknowledgement, and negotiation of circuit switched parameters associated with acceptance of a call and fallback to the circuit switched radio link 106 is encapsulated as the data portion within lower level data packets 120 that are transmitted/received over the packetized data network, which includes links 115, 119, and 109. Hence, as the name implies, circuit switched notification data 121 employs a data packet 120 as a tunnel through which circuit switched parameters are transmitted/received.

This "tunneling" protocol is defined in *E-UTRAN—cdma2000 1× Connectivity and Interworking Air Interface Specification*, Version 2.0, April 2011, C.S0097-0, published by the 3$^{rd}$ Generation Partnership Project 2 (3GPP2) (hereinafter, "the '0097 Specification). The protocol that prescribes the circuit switched fallback to 1× mechanism for a single radio mobile station 101 as of the invention date is found in *Circuit Switched (CS) Fallback in Evolved Packet System (EPS); Stage 2*, Version 10.2.1, 2013-01-04, TS 23.272 published by 3GPP2 (hereinafter, "the '272 Specification).

The internetwork interface 112 is a back end special-purpose equipment element that executes the interface between the mobile switching center 114 and the packetized data mobility entity 116, and is responsible for most of the processing associated with tunneling the circuit switched data 121. Tunneling packets 120 are routed through the mobility entity 116 and the base station 110 over the links 115, 119, 109, but processing of the data 121 is only required at the endpoints 101, 112. As regards present day circuit switched networks such as 1×RTT, there is a great deal of configuration information which must be processed by the endpoints of a circuit switched event in order to guarantee quality of service. In 1×, the protocol layer at with this information is processed is known as the link access control (LAC) layer. The packetized data modem 104 and packetized data base station 110 also include LAC processing elements (not shown) to support layered communications over the packetized data network. However, in order to provide for notification of circuit switched calls and other events over the packetized data network, tunneled LAC (TLAC) layer processing elements are required in both the internetwork interface 112 and the packetized data modem 104. Thus, the packetized data modem 104 includes a TLAC processor 105 and the internetwork interface 112 includes a TLAC processor 113. These processors 105, 113, among other functions that will be described below, perform the LAC layer processing that is required in the packetized data modem 104 and internetwork interface 112, respectively, to provide for notification of circuit switched calls and other events over the packetized data network. Certainly, since the primary purpose of the internetwork interface 112 is to interface the circuit switched network to the packetized data network, it follows then that processing of LAC layer information is necessary. In fact, the sole purpose of the internetwork interface 112 is to provide for tunneling of circuit switched data over the packetized data network.

As one skilled in the art will further appreciate, the hardware and software associated with tunneling information related to circuit switched calls and events over the packetized data network is limiting and cumbersome at best. Special purpose equipment (e.g., internetwork interface 112) is required to bridge the circuit switched data to the mobile station 101 over the packetized data tunnel, and thus the present inventors have observed that such equipment contributes to increased power consumption and decreased reliability of the communications system as a whole.

In current communication architecture, there are two common 1×-LTE hybrid solutions. The first one is SV-LTE (Simultaneous Voice and LTE Long Term Evolution), A protocol and technical standard that allows a phone to use both voice and data networks at the same time. Specifically, when the voice network is CDMA 1×RTT and the data network is LTE (4G.) In an SV-LTE user equipment, two sets of transmitters and receivers are implemented, which means two radios work independently in one user equipment. The user equipment can connect the LTE network and CDMA 2000 1× network at the same time. As there are two sets radios, the ordinary skilled in the art are may know that there are also two sets of baseband processors corresponding with two sets radios. In this solution, LTE network provides data service and 1× provides voice service. This solution is only need user equipment modification and adaptation. For both of the 1× network and LTE network, this solution requires no amendment and additional element, to both of device and protocol. That is, it does not requires any network support and any interaction between 1× and LTE. But the disadvantage is it needs two independent ratio, which make the cost and power consuming much higher than ordinary user equipment.

Another solution is CSFB (Circuit Switch Fall Back) or eCSFB (evolved CSFB). In this solution, only one set of transmitter and receiver is required, it could be called one radio or single radio. To contrast with the above SV-LTE, it needs an interface support to the network, such as S-102. LTE only provide data service and if user equipment launches and receives a call from 1× network. A notification is sent to the user equipment through S-102 interface and let the UE fall back to circuit switch field and handle the call. This solution needs network support and interaction between 1× and LTE. The disadvantage is the reaction speed is low not only in progress of answering the call, but also returns the LTE network when the call is done.

The present invention overcomes the above noted problems, and others, by providing a technique for transmitting and receiving circuit switched in a single radio dual mode mobile station. The invention is wholly embodied in the mobile station, thus alleviating the requirement for an internetwork interface 112, and it does not requires S102 interface and minimum the network support and delay for switching to 1× voice The present invention will now be discussed with reference to FIGS. 2-5.

Figure 2:
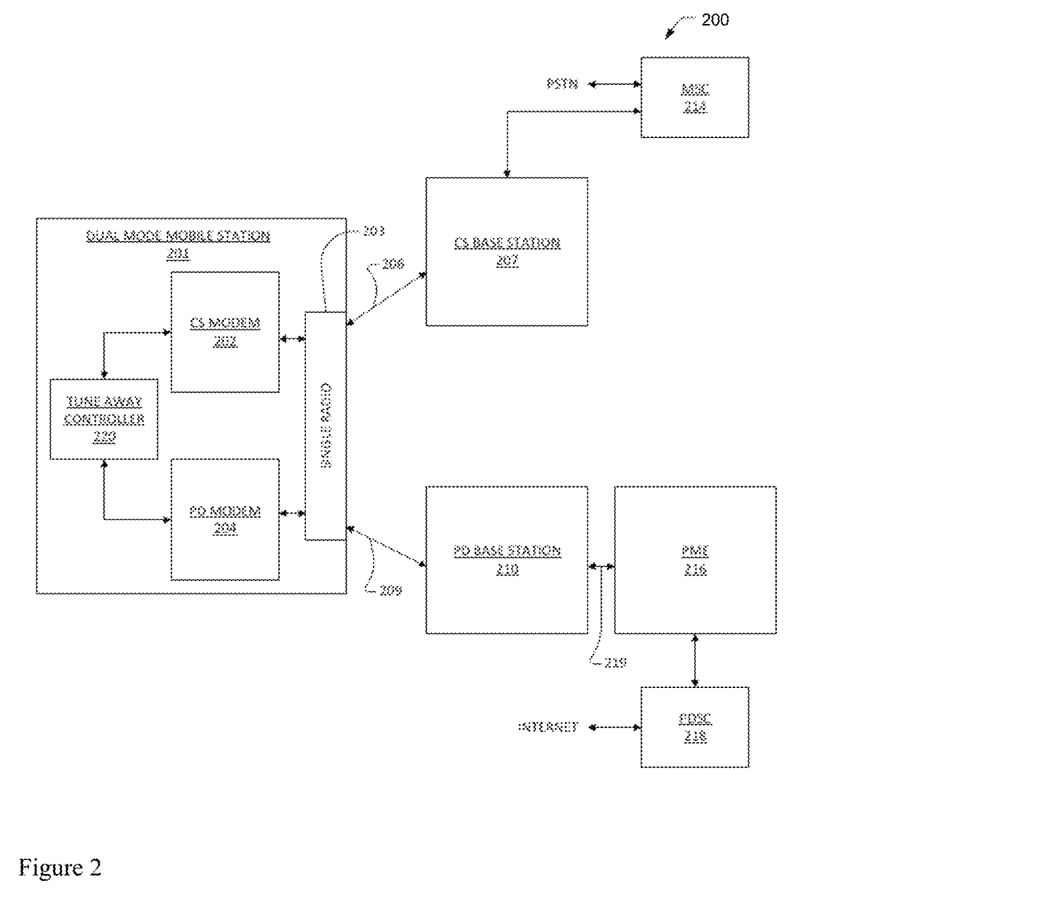
FIG. 2 is a block diagram depicting a dual mode cellular architecture according to one embodiment of the present invention.

Turning now to FIG. 2, a block diagram is presented depicting a tune away dual mode cellular architecture 200 according to the present invention. Like the architecture 100 discussed above with reference to FIG. 1, the architecture 200 according to the present invention utilizes a single radio dual mode mobile station 201 for transmitting and receiving over both a packetized data radio link 209 and a circuit switched radio link 206. The single radio dual mode cellular architecture 200 is provided for notifying the dual mode mobile station 201 of an incoming call or other circuit switched event, but rather than employing the tunneling technique discussed above.

In one embodiment of the present invention, the single radio is different from the single radio in CSFB solution. Hereinafter, the single radio contains one set transmitter and two sets tunable receiver. The one set transmitter is shared by LTE network and 1× network, and the two sets receivers are separately assigned to LTE network and 1× network which can simultaneously receive traffic over LTE on the primary RF chain and IS-2000 paging on the secondary RF chain. Of course, sometimes the two sets receivers could be only assigned to LTE network or the 1× network, which depends on the user's configuration. When the two receivers are both assigned to one network, in some special occasions, the paging message is likely to be omitted and dropped.

In the dual-receiving mode, also called dual-RX mode, it is seldom to bear data communication simultaneously, because data service requests uplink and downlink transmission, it is not accommodated by single radio as there is only one transmitter. However, it is quite common that one of the two receivers catches data and another RX monitors the paging message. It should be comprehended by the ordinary skilled people that monitoring 1× control channel have priority than LTE, because voice call is usually much more important than traffic service, so some degradation of LTE paging performance is acceptable. The present invention utilizes a tune away technique to accomplish the same ends without a requirement for special back end equipment such as an internetwork interface 112. The architecture 200 includes the mobile station 201, which has a circuit switched modem 202 for processing circuit switched cellular applications, and a packetized data modem 204, for processing packetized data applications. The modems 202, 204 are baseband modems and share a single radio 203 for transmission of signals over either the packetized data radio link 209 or the circuit switched radio link 206. The mobile station 201 is thus coupled to a circuit switched base station 207 via the circuit switched radio link 206 and to a packetized data base station 210 over the packetized data radio link 209.

The circuit switched base station 207 is coupled to a mobile switching center 214. And in contrast to the architecture 100 of FIG. 1, the present invention does not require an internetworking interface 112. The mobile switching center 214 routes calls and events to/from a public switched telephone network (PSTN). For transmission and reception of packetized data, a packetized management entity (PME) 216 is coupled to a packetized data switching center (PDSC) 118, which routes data and events to/from a packetized data network such as the Internet.

In operation, circuit switched calls and events over the PSTN are routed by the mobile switching center 214 to the circuit switched base station 207. All control and traffic associated with the calls or other events occurs over the circuit switched radio link 206 are processed by the circuit switched modem 202 within the mobile station 201. Likewise, packetized data and events over the internet are routed by the packetized data switching center 218 to a particular packetized data mobility entity 216 that is interfaced to the packetized base station 210 currently assigned to the mobile station 201. All control and traffic associated with the packetized data or other events occur over the packetized data radio link 209 and are received by the radio 203 and processed by the packetized data modem 204 within the mobile station 201.

One embodiment of the present invention contemplates scenarios and circumstances associated with certain present day dual mode configurations, one example of which is a single radio dual mode mobile station 201 that is capable of processing circuit switched calls and other events over a CDMA radio link such as might be found in a CDMA2000 1xRTT architecture, and that processes packetized data and other events over a packetized data radio link 209 such as might be found in a Evolved Universal Mobile Telecommunications System Terrestrial Radio Access Network (EU-TRAN) (i.e., LTE) architecture. Although examples will be henceforth discussed with reference to both 1x and LTE, the present inventors note that such examples are provided to teach the present invention in the context of well-known exclusive data protocols. However, the present inventors note that the scope of the present invention is not to be limited to 1x and LTE, but rather extended to comprehend single radio dual mode cellular architectures 200 where one of the radio links 209 employed is presently utilized to notify the mobile station 201 of an incoming voice call or other event that is associated with a circuit switched link 206 having timing and quality of service properties and requirements unique to circuit switched applications.

The PME 216 interfaces to many packetized data base stations 210 While packetized data is being exchanged over the packetized data radio link 209, for purposes of the present application, the circuit switched elements 202, 207, 214 shown in the architecture 200 are effectively idle and the radio 203 is employed to communicate over the packetized data link 209. Packetized data is routed to/from the Internet via the packetized data switching center 218, through the packetized data mobility entity 216, through the packetized data base station 210, and over the packetized data radio link 209 to/from the baseband packetized data modem 204 within the mobile station 201.

But in contrast to present day architectures 100, when a circuit switched notification is required such as, but not limited to, registration, mobile call origination (i.e., the mobile station 201 places a call), or mobile call termination (i.e., the mobile station 201 receives a call), the mobile station 201 according to the present invention tunes away from activity over the packetized data radio link 209 and performs the required circuit switched operations over the circuit switched radio link 206, as will be described in further detail below.

In one embodiment, a tune away message is transmitted to the packetized data base station 210 in order to time synchronize absence of the mobile station 201 from participation in activity over the packetized data radio link 209. Another embodiment synchronizes tune away events to coincide with 1x power saving sleep and wake times for the mobile device 201. The mobile station 201 thus includes a tune away controller 220 that is configured to synchronize timebases between the packetized data network and the circuit switched network, to perform tune away events via the baseband circuit switched modem 202 and the baseband packetized data modem 204, and to format and process tune away request messages and responses.

Figure 3:
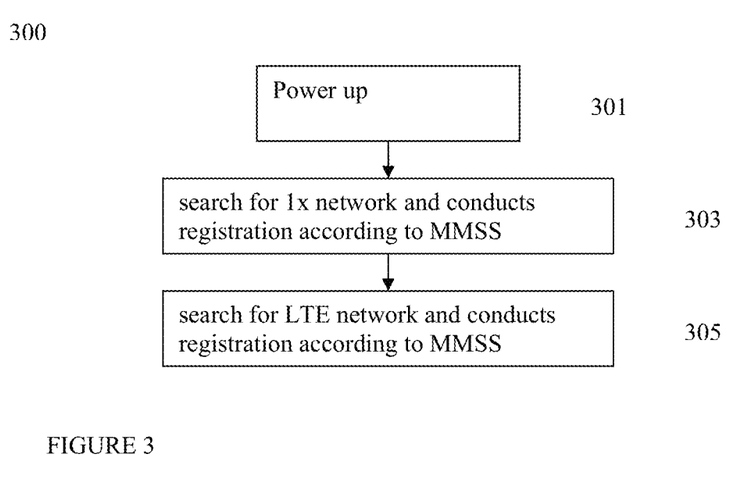
FIG. 3 is a flow chart featuring a power up flow of a single radio dual mode mobile device according to the present invention, such as might be employed by the architecture of FIG. 2.

Referring to FIG. 3, a flow chart 300 is presented featuring a power up flow of a single radio dual mode mobile device, such as might be employed by the architecture of FIG. 2. The Flow begins from block 301 where a mobile station of the present invention power up. Then at block 303, the mobile station searches for 1x network and conducts registration according to MMSS (Standard approach or operator specific). MMSS could be defined by user or service provider. Then at block 305, the mobile station searches for LTE network and conducts registration. After the mobile station complete access to both 1x network and LTE network. The mobile station enters the idle state and waiting for call or other event. Hereinafter the mobile register/attach separately to each RAT, such as 1x and LTE and the mobile maintains registration (1x) and mobility management (LTE) to each RAT separately. In one embodiment, 1x registration always takes precedence.

Figure 4:
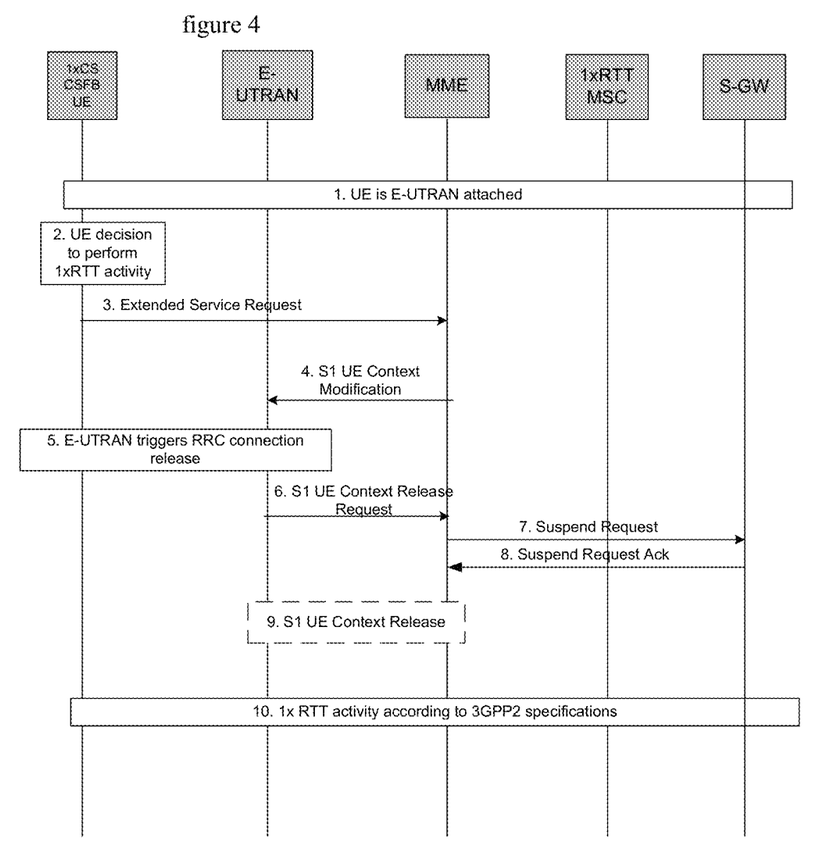
FIG. 4 is a flow chart featuring a 1xMO (mobile original) call flow method of a single radio dual RX user equipment according to the present invention, such as might be employed by the architecture of FIG. 2.

Referring to FIG. 4, a flow chart 400 is present featuring a 1xMO (mobile original) call flow method of a single radio dual RX user equipment according to the present invention, such as might be employed by the architecture of FIG. 2.

At step 1, the mobile device or user equipment (later called UE) is EUTRAN attached according to the registration flow in FIG. 3, of course the UE should also be registered in 1xRTT CS.

Then at step 2, UE makes a decision that it needs to perform some 1xRTT activity, e.g. in order to respond to an incoming 1xRTT page, setup a MO call, perform location management signaling, or perform re-registration. This decision may be indicated by the user or UE itself.

At step 3, UE sends an Extended Service Request, one of CS Fallback Indicator, to the MME (Mobility Management Entity). The figure shows the case the UE is in active state in E-UTRAN but the same principles applies if the UE is in idle state.

At step 4, MME sends a S1-AP message that includes: a CS Fallback Indicator to indicate the EUTRAN to move the UE to 1xRTT.

At step 5. The E-UTRAN triggers RRC (Radio Resource Control) connection release and continues with step 6. The E-UTRAN shall not include any redirection information towards the UE.

At step 6. E-UTRAN sends an S1 UE Context Release Request (Cause) message to the MME. Cause indicates that the S1 UE Context Release was caused by CS fallback to 1xRTT.

At step 7, MME sets the UE context to suspended status and sends to the S-GW (serving gateway) a Suspend Request (IMSI) message that requests the suspension of EPS bearers for the UE. S-GW affords traffic transmission. The S1-U bearers are released for all EPS bearers by the MME and all GBR bearers are deactivated. S1-U is the interface between EUTRAN and MME. The non-GBR bearers are preserved and are marked as suspended in the S-GW. EPS (evolved packet system) contains e NodeB, MME and S-GW.

At step 8, S-GW acknowledges the Suspend Request message and marks the UE as suspended. When a downlink data arrives at the S-GW, the S-GW should not send a downlink data notification message to the MME if the UE is marked as suspended.

At step 9, S1 UE Context in the E-UTRAN is released.

Figure 5:
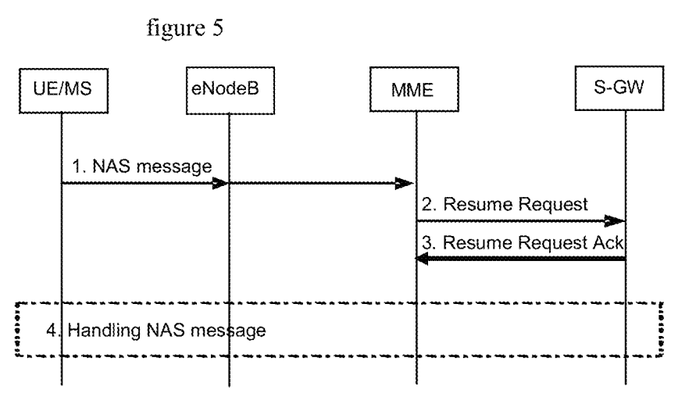
FIG. 5 is a flow chart featuring Dual Rx Device Procedures for Returning to LTE of a single radio dual mode mobile device according to the present invention, such as might be employed by the architecture of FIG. 2.

Referring to FIG. 5, a flow chart 500 is presented featuring Dual Rx Device Procedures for Returning to LTE of a single radio dual mode mobile device, such as might be employed by the architecture of FIG. 2.

At step 1. The UE sends a NAS message, e.g. Service Request or TAU, to the MME.

At step 2, If the UE context in the MME indicates that UE is in suspended status, the MME sends a Resume Request (IMSI) message to the S-GW that requests the resumption of EPS bearers for the UE.

At step 3, The S-GW acknowledges the Resume Request and clears the UE's suspending status.

At step 4. The NAS message is processed accordingly.

In one embodiment of the present invention, when the communication with LTE is idle, Each RAT monitor its page slot or paging occasion. When the communication with LTE is connected, Mobile device uses secondary RF chain to monitor 1x paging slot. If no response require on 1x, No page match, like SMS, etc. Mobile can allocate the second RF chain back to LTE. If response is required on 1×, the mobile device may follow the flow of 1×MO procedure in FIG. 4.

It should be understood that some Additional Requirement on LTE Processing exists during 1× Calls. 1× calls include mobile originated or mobile terminated voice call, registration, SMS or other data burst related application. In LTE idle mode, It is not necessary for the UE to inform LTE system that it will tune away to 1× system for 1× calls. In LTE connected mode, The UE shall inform LTE that it will tune away for 1× calls and LTE service shall be suspended. When the UE is on a voice call in 1× system, the UE shall put the LTE part into power saving mode It should be borne in mind that all of the above and similar terms are to be associated with appropriate physical quantities and are merely convenient labels applied to these quantities. Unless specifically stated otherwise, or as is apparent from the discussion, terms such as "processing," "computing," "calculating," "determining," "displaying," or the like, refer to the action and processes of a computer system, a microprocessor, a central processing unit, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software-implemented aspects of the invention are typically encoded on some form of program storage medium or implemented over some type of transmission medium. The program storage medium may be electronic (e.g., read only memory, flash read only memory, electrically programmable read only memory), random access memory magnetic (e.g., a floppy disk or a hard drive) or optical (e.g., a compact disk read only memory, or "CD ROM"), and may be read only or random access. Similarly, the transmission medium may be metal traces, twisted wire pairs, coaxial cable, optical fiber, or some other suitable transmission medium known to the art. The invention is not limited by these aspects of any given implementation.

The particular embodiments disclosed above are illustrative only, and those skilled in the art will appreciate that they can readily use the disclosed conception and specific embodiments as a basis for designing or modifying other structures for carrying out the same purposes of the present invention, and that various changes, substitutions and alterations can be made herein without departing from the scope of the invention as set forth by the appended claims.

What is claimed is:

1. A mobile station comprising:
 a radio including a single transmitter, a circuit-switched dedicated receiver, and a packetized-data dedicated receiver,
  the single transmitter being configured to either transmit voice calls and circuit-switched data via a CDMA2000 radio link or transmit packetized data via a Long Term Evolution (LTE) radio link,
  the circuit switched dedicated receiver being configured to receive voice calls and circuit-switched signals from the CDMA2000 radio link, and
  the packetized-data dedicated receiver being configured to receive packetized-data signals from the LTE radio link, the receivers being further configured to receive simultaneously; and
 a tune-away controller configured to synchronize time bases of a packetized-data network and a circuit switched network, obtain a circuit-switched notification, and in response to obtaining the circuit-switched notification, end transmission and reception of packetized data via the LTE radio link and the packetized-data network, and start reception of voice calls via the circuit switched dedicated receiver and the circuit switched network.

2. The mobile station of claim 1 further comprising:
 a circuit-switched modem configured to transmit CDMA2000 signals over the CDMA2000 radio link via the single transmitter, receive CDMA2000 signals from the CDMA2000 radio link via the circuit switched dedicated receiver, and receive the circuit-switched notification via the CDMA2000 radio link.

3. The mobile station of claim 1 further comprising:
 an LTE modem configured to transmit LTE signals over the LTE radio link via the single transmitter, and receive LTE signals from the LTE radio link via the packetized-data dedicated receiver.

4. The mobile station of claim 1, wherein the circuit-switched notification includes a notification of an incoming call to the mobile station.

5. The mobile station of claim 1, wherein the circuit-switched notification includes a notification of an outgoing call from the mobile station.

6. A mobile station comprising:
 a radio including a single transmitter, a circuit-switched dedicated receiver, and a packetized-data dedicated receiver,
  the single transmitter being configured to transmit voice calls and circuit-switched data via a circuit-switched radio link or transmit packetized data via a packetized-data radio link;
  the circuit-switched dedicated receiver being configured to receive voice calls and circuit-switched signals from the circuit-switched radio link; and
  the packetized-data dedicated receiver being configured to receive packetized-data signals from the packetized-data radio link;
 a circuit-switched modem configured to transmit circuit-switched signals over the circuit-switched radio link via the single transmitter, receive circuit-switched signals from the circuit-switched radio link via the circuit-switched dedicated receiver, and receive a circuit-switched notification via the circuit-switched radio link;
 a packetized-data modem configured to transmit packetized-data signals over the packetized-data radio link via the single transmitter, and receive packetized-data signals from the packetized-data radio link via the packetized-data dedicated receiver; and
 a tune-away controller configured to synchronize time bases of a packetized-data network and a circuit switched network, and, in response to the reception of the circuit-switched notification, deactivate the packetized-data modem to end transmission of packetized data or reception of packetized data over the packetized-data radio link and the packetized-data network, and receive voice calls over the circuit-switched radio link and the circuit switched network.

7. The mobile station of claim 6, wherein the circuit-switched radio link employs a CDMA2000 communication standard for voice and data communication.

8. The mobile station of claim 6, wherein the packetized-data radio link employs a Long Term Evolution (LTE) communication standard for data communication.

9. The mobile station of claim 6, wherein the circuit-switched dedicated receiver and the packetized data dedicated receiver are further configured to receive simultaneously.

10. The mobile station of claim 6, wherein the single transmitter is further configured to either transmit the voice calls and the circuit-switched data via the circuit-switched radio link or transmit the packetized data via the packetized-data radio link.

11. The mobile station of claim 6, wherein the circuit-switched notification includes a notification of an incoming call to the mobile station.

12. The mobile station of claim 6, wherein the circuit-switched notification includes a notification of an outgoing call from the mobile station.

13. A method comprising:
transmitting packetized data with a transmitter over a packetized-data radio link;
receiving packetized data with a packetized-data dedicated receiver from the packetized-data radio link;
receiving circuit-switched data with a circuit-switched dedicated receiver over a circuit-switched radio link, wherein the reception of the packetized data and the reception of the circuit-switched data occur simultaneously;
obtaining a circuit-switched notification;
synchronize time bases of a packetized-data network and a circuit switched network; and
in response to the obtained circuit-switched notification, ending the transmission or reception of the packetized data over the packetized-data radio link and the packetized-data network, and establishing voice communications over the circuit-switched radio link and the circuit switched network.

14. The method of claim 13, wherein circuit-switched radio link employs a CDMA2000 communication standard for voice and data communication.

15. The method of claim 13, wherein the packetized-data radio link employs a Long Term Evolution (LTE) communication standard for data communication.

16. The method of claim 13, wherein the single transmitter is further configured to either transmit voice calls and circuit-switched data via the circuit-switched radio link or transmit packetized data via the packetized-data radio link.

17. The method of claim 13, wherein the circuit-switched notification includes a notification of an incoming call to a mobile station.

18. The method of claim 13, wherein the circuit-switched notification includes a notification of an outgoing call from a mobile station.

19. The method of claim 13, wherein the establishing voice communications includes transmitting voice over the circuit-switched radio link or receiving voice over the circuit-switched radio link.

* * * * *